No. 734,302. PATENTED JULY 21, 1903.
H. CARMICHAEL.
SIPHON FILLER.
APPLICATION FILED AUG. 8, 1902. RENEWED JUNE 1, 1903.
NO MODEL. 2 SHEETS—SHEET 1.
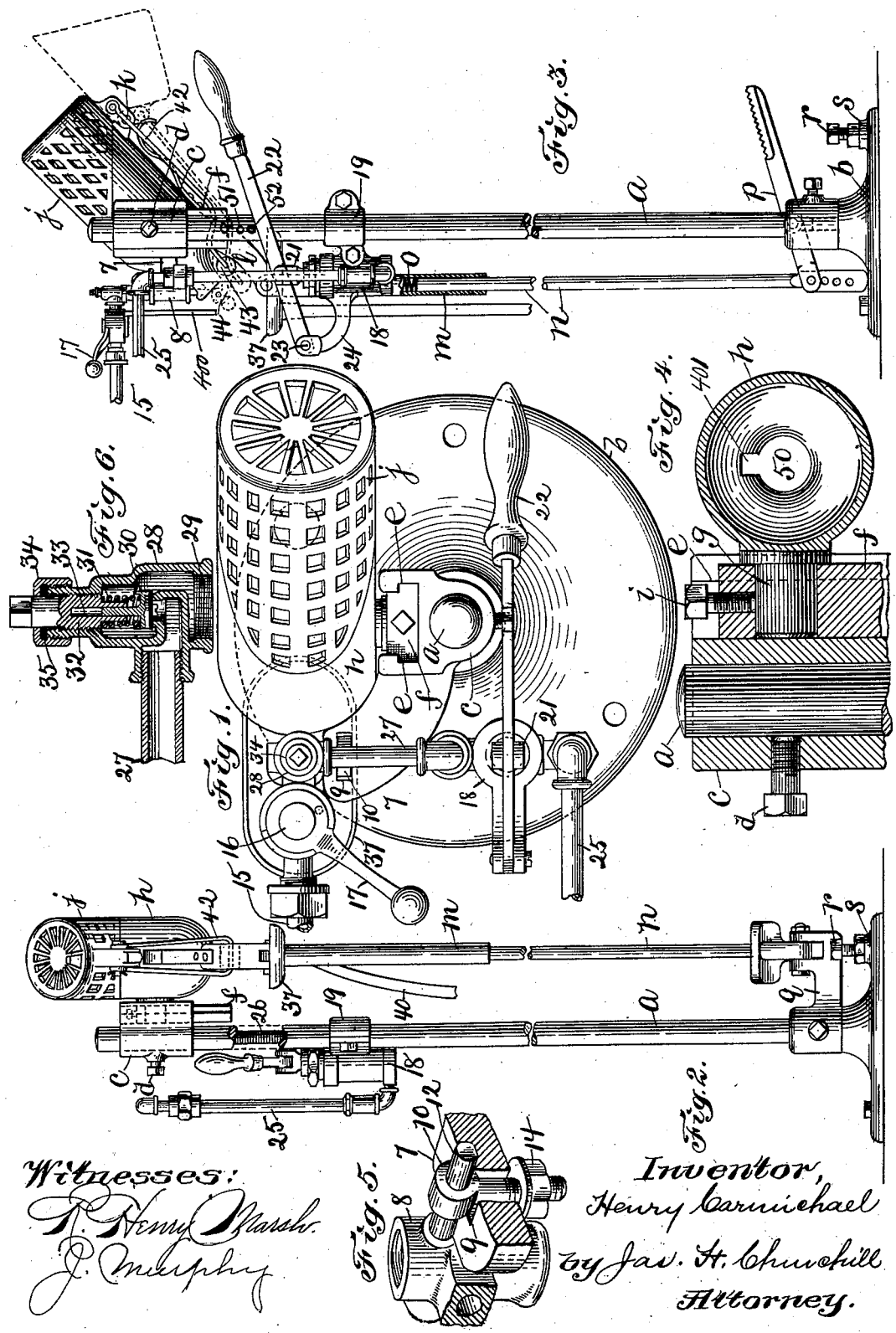
Witnesses:
R. Henry Marsh.
J. Murphy
Inventor,
Henry Carmichael
by Jas. H. Churchill
Attorney.

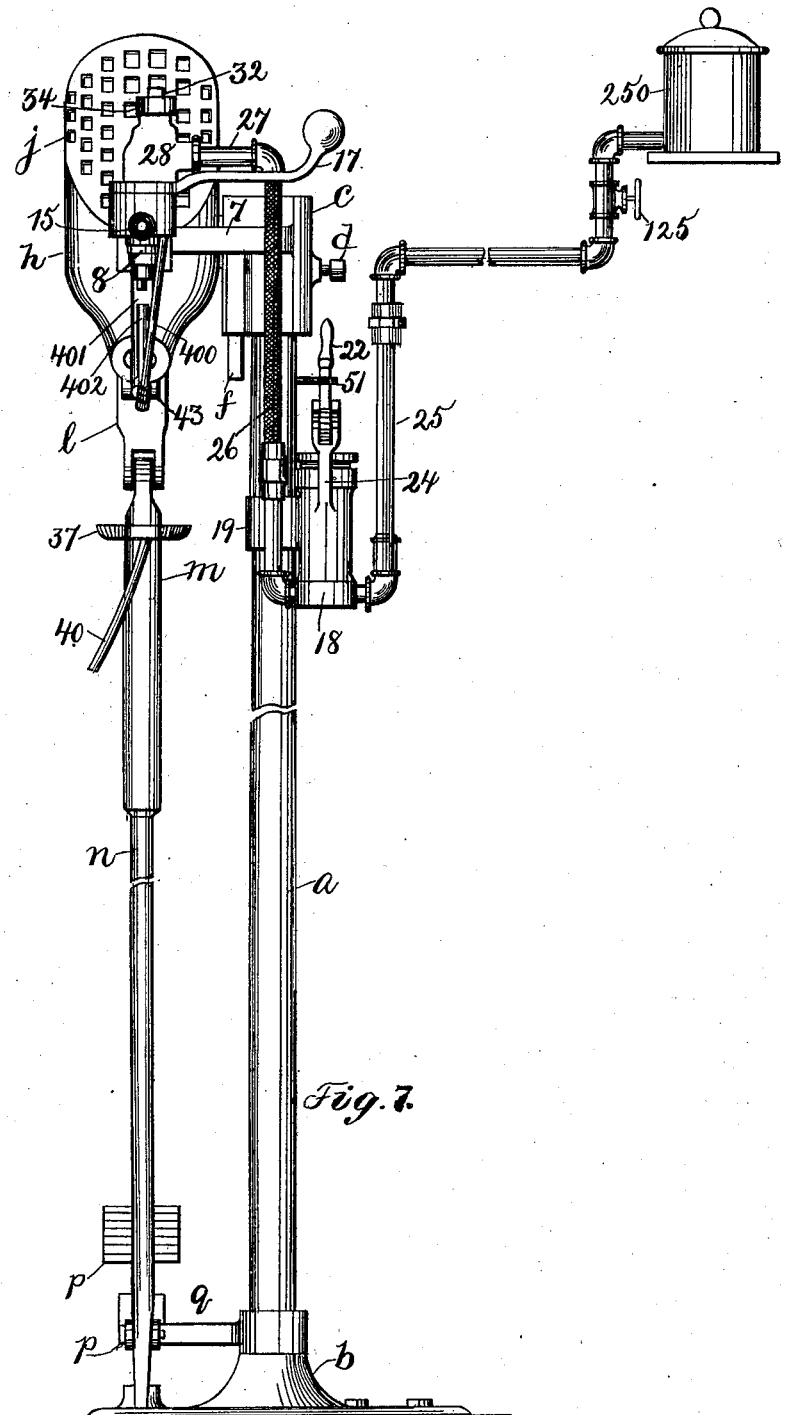

No. 734,302. Patented July 21, 1903.

UNITED STATES PATENT OFFICE.

HENRY CARMICHAEL, OF MALDEN, MASSACHUSETTS, ASSIGNOR TO STATIC CARBONATING COMPANY, OF NEW YORK, N. Y., A CORPORATION OF MAINE.

SIPHON-FILLER.

SPECIFICATION forming part of Letters Patent No. 734,302, dated July 21, 1903.

Application filed August 8, 1902. Renewed June 1, 1903. Serial No. 159,615. (No model.)

*To all whom it may concern:*

Be it known that I, HENRY CARMICHAEL, a citizen of the United States, residing in Malden, in the county of Middlesex and State of Massachusetts, have invented an Improvement in Siphon-Fillers, of which the following description, in connection with the accompanying drawings, is a specification, like characters on the drawings representing like parts.

This invention relates to a siphon-filler, and has for its object to provide a simple and efficient apparatus for the purpose specified.

The particular features of the invention will be pointed out in the claims at the end of this specification.

Figure 1 is a plan view, on an enlarged scale, of a siphon-filler embodying this invention; Fig. 2, a rear elevation of the apparatus shown in Fig. 1; Fig. 3, a side elevation of the apparatus shown in Fig. 2 looking toward the right; Figs. 4, 5, and 6, details to be referred to; and Fig. 7, an elevation, on an enlarged scale, of the apparatus shown in Fig. 3 looking toward the right.

Referring to the drawings, $a$ represents a standard or upright secured at its lower end to a suitable base $b$. The standard $a$ has fitted upon it a guide-block $c$, which is adjustably fixed on the said standard by a set-screw $d$. The guide-block $c$ is provided with vertically-arranged guideways $e$, (see Figs. 1 and 4,) in which moves a slide-plate $f$, having in its front face a suitable hole or opening in which is inserted a cylindrical stud $g$, which projects from the side of the siphon-holder $h$ and which constitutes a pivot for the said holder to enable the latter to be turned in a vertical plane for a purpose as will be described, and which is secured in its adjusted position by the set-screw $i$. (See Figs. 2 and 4.)

The siphon-holder $h$ may be of any suitable or usual construction and, as shown, is provided with a movable upper portion or cap $j$, pivoted at $k$ to the said holder. The siphon-holder $h$ is provided with a forwardly-projecting arm $l$, pivotally attached to a vertically-movable support comprising a tubular upper portion $m$, a link or rod $n$, having its upper end inserted into said tubular portion, and an interposed spring $o$. The rod $n$ is adjustably connected at its lower end to a foot-treadle $p$, pivoted to an arm $q$ on the upright $a$ and coöperating with a stop, (shown as a screw $r$,) which is adjustable in a suitable socketed boss $s$ on the base. The stop $r$ serves to limit the downward movement of the treadle, and thereby limits the pressure placed upon the spring $o$, consequently limiting the pressure with which the siphon-holder is forced upward, thereby avoiding the breakage of the neck of the bottle or siphon and the consequent explosion thereof with the danger and loss arising therefrom.

The guide block or collar $c$ has attached to it a curved arm or bracket 7, (see Fig. 7,) extended toward the plane in which the siphon-holder moves and on which is adjustably supported the socket-piece 8 for the nozzle of the siphon, as more clearly shown in Fig. 5. The socket-piece 8 may be of any suitable or usual construction, such as now commonly found on apparatus of this class, it being provided with a suitable mouth for the entrance of the nozzle of the siphon, which mouth communicates with the supply for the carbonated water. The bracket 7, near its front end, is provided with an oblong slot 9, extended in a plane parallel with the longitudinal plane of the siphon-holder. Through the slot 8 is extended the shank of an eyebolt 10, the eye of which is above the upper surface of the bracket and receives within it a stud or projection 12, extended laterally from the socket-piece 8. The stud or projection 12 is preferably made flat on its under side to rest squarely on the upper surface of the bracket, against which it is firmly clamped by a nut 14 on the shank of the eyebolt below the said bracket.

By reference to Fig. 5 it will be seen that the socket-piece 8 is capable of adjustment in two directions in the same plane—namely, it can be moved in a horizontal plane in one direction by moving the eyebolt in the slot $q$ and in another direction substantially at right angles thereto by moving the stud or projection 12 into or out of the eyebolt. These adjustments can be performed by merely loosening the nut 14 and moving the socket-piece in the desired direction, after which the said socket-piece can be secured in its adjusted position by setting up the nut 14.

The socket-piece 8 is connected by a pipe 15 with a source of supply for the charged water, the supply of which is controlled by a suitable valve 16, having a handle 17, and the said socket-piece is also connected with a pump 18, secured, as by a clamp 19, to the upright or standard $a$.

The pump 18, which may be of any usual or suitable construction, has its piston-rod 21 connected to a handle 22, which is pivoted at 23 to an arm 24, projecting from the pump-cylinder, which latter is provided with a liquid-supply pipe 25, connected to a tank 250 (see Fig. 7) or other source of mineral salts which it may be desired to admix with the charged water in the siphon. The pipe 25 may be provided with a suitable valve 125. (See Fig. 7.)

The pump 18 is provided with a discharge-pipe, comprising, as herein shown, a substantially vertical section 26, of hose or other flexible pipe, (see Figs. 2 and 7,) and a horizontal section 27, which is connected with the inlet-port of a valve-fitting 28. (See Figs. 6 and 7.)

The valve-fitting 28 has its outlet-port 29 located over and substantially in line with the socket-piece 8, and in order to avoid waste of the vichy or other mineral liquid the valve-fitting is provided with a valve 30, seated by a spring 31, which bears against the valve at one end and against an externally-threaded rod or nut 32, which engages screw-threads on the inner side of the valve-fitting. The threaded rod or nut 32 is provided with a socket 33 for the reception of the stem of the valve 30.

By reference to Fig. 6 it will be seen that the pressure of the spring 31 on the valve can be adjusted by turning the threaded rod or nut 32, the end of which projects through a suitable cap 34 on the valve-fitting, and also through suitable packing 35 between said cap and fitting.

The spring-pressure on the valve can be regulated so as to equal or exceed the hydrostatic pressure of the column of vichy or other liquid in the supply-tank 250, connected with the pump, thereby avoiding waste of liquid from this source. The supply-tank for the vichy is usually elevated above the pump, as represented in Fig. 7, and the liquid therefrom would force its way through the valves of the pump when the latter is disconnected from the siphon if the provision above referred to were not made to equal or exceed the hydrostatic pressure of the column of liquid in the supply-tank.

By means of the flexible section 26 of the outlet-pipe for the pump the valve-fitting 28 can be moved to adjust it to the socket-piece 8.

The valve-fitting 28 is located over the socket-piece 8 and in close proximity thereto, so as to reduce to a minimum the waste of vichy or other liquid when the siphon is filled or substantially filled, and in order to catch the liquid which fills the socket-piece and the valve fitting and which runs to waste when the siphon-nozzle is withdrawn from the socket 8 I have provided a drip pan or trough 37, which is suitably secured to the support for the siphon-holder and which may be provided with an outlet-pipe 40, leading to a pail or other suitable receptacle. (Not shown.) The waste liquid may be conducted to the drip-pan 37 through the pipe 400.

The cap $j$ of the siphon-holder has attached to it a device for opening the valve of the siphon, which device, as herein represented, consists of a yoke-shaped piece 42, which embraces the arm $l$ and is secured at its ends to the cap $j$.

The front portion of the yoke 42 carries a roller 43, which is drawn up on the arm $l$ when the cap $j$ is closed, as indicated by full lines, Fig. 3, and at such time the roller engages the finger-lever 44, (indicated by dotted lines,) which controls the valve of the siphon.

In operation the operator opens the cap $j$ and places the empty siphon in the holder $h$, with the neck of the bottle extended through the opening 50 (see Fig. 4) in the holder, the said opening having a vertically-arranged extension 401 (see Figs. 4 and 7) for the passage of the nozzle 402 of the siphon. The cover or cap $j$ is then closed, as represented in Fig. 3. The treadle $p$ is depressed until it engages the stop $r$. The depression of the treadle raises the support for the siphon-holder $h$, which is guided in its upward movement by the guideways $e$, the slide $f$ moving with the holder. The slide $f$ moving in the guideways insures easy and accurate vertical movement of the siphon-holder, avoids twisting movement of the holder, and assists in accurately centering the nozzle 402 of the siphon in the socket-piece 8. The yielding medium or spring $o$, interposed between the treadle and the siphon-holder, cushions the pressure on the siphon, and the amount of the pressure with which the nozzle of the siphon is forced against the socket-piece 8 can be regulated or adjusted by the stop $r$, thus avoiding breaking of the neck of the siphon, danger of explosion, and the danger and loss arising therefrom. When the siphon is properly positioned, the valve 16 is opened and water charged with carbonic-acid gas is admitted into the siphon.

If it is desired to add vichy or other liquid, the pump is operated, and the quantity forced into the siphon can be controlled by regulating the stroke of the pump, which may be effected by a stop or pin 51 inserted into one of a series of holes 52 in the standard $a$.

I claim—

1. In a siphon-filler, the combination with a standard or upright, of a guide-block secured to said standard, a slide movable in said guide-block, a siphon-holder secured to said slide, a vertically-movable support for said siphon-holder, and means to move said support, substantially as described.

2. In a siphon-filler, the combination with a standard or upright, of a guide-block secured to said standard, a slide movable in said guide-block, a siphon-holder secured to said slide, a treadle, and a support for said siphon-holder connected to said treadle and provided with yielding means between said treadle and said holder, substantially as described.

3. In a siphon-filler, the combination with a standard or upright, of a guide-block secured to said standard, a slide movable in said guide-block, a siphon-holder secured to said slide, a treadle, and a support for said siphon-holder connected to said treadle and provided with yielding means between said treadle and said holder, and a stop to limit the downward movement of said treadle, substantially as described.

4. In a siphon-filler, the combination with a standard or upright, of a guide-block secured to said standard, a slide movable in said guide-block, a siphon-holder secured to said slide, a treadle, a support for said siphon-holder connected to said treadle and provided with yielding means between said treadle and said holder, and an adjustable stop to limit the downward movement of said treadle, substantially as described.

5. In a siphon-filler, the combination with a standard or upright, of a guide-block secured to said standard, a slide movable in said guide-block, a siphon-holder provided with a stud or pin, means to secure said stud or pin to said slide, a vertically-movable support for said holder comprising a tubular upper section connected with said holder, a lower section or rod inserted into said tubular section, a yielding medium within said tubular section and engaged by said lower section or rod, and a treadle connected to said lower section or rod, substantially as described.

6. In a siphon-filler, the combination with a standard, of a guide-block secured thereto, an arm projecting from said guide-block, and provided near its front end with a slot, an eyebolt having its shank inserted through said slot and movable bodily therein, a socket-piece provided with a stud or projection extended into said eyebolt substantially at right angles to said slot, and means to secure said eyebolt to said arm, substantially as and for the purpose specified.

7. In a siphon-filler, the combination with a standard, of a pump supported by said standard, a socket-piece supported from said standard, a valve-fitting having its inlet-port communicating with the discharge-port of said pump and having its outlet-port communicating with said socket-piece, a valve in said fitting, a spring to normally hold said valve seated, an externally-threaded rod or nut engaging screw-threads on the interior of said fitting and provided with a socket into which the stem of said valve extends, substantially as described.

8. In a siphon-filler, the combination with a standard, of a guide-block secured thereto, a slide movable in said guide-block, a siphon-holder attached to said slide, a socket-piece with which said siphon-holder coöperates, a vertically-movable support for said siphon-holder, and a drip pan or trough carried by said movable support, substantially as described.

9. In a siphon-filler, the combination with a vertically-movable siphon-holder, a movable support for said holder, a treadle to operate said support, a cushioning medium interposed between said treadle and said holder and forming part of said support, and means to limit the downward movement of said treadle, substantially as described.

10. In a siphon-filler, the combination with a standard or upright, of a guide-block secured to said standard and provided with vertical guideways, a slide vertically movable in said guideways, a siphon-holder secured to said slide, and means to move said holder, the latter being guided in its movement and prevented from twisting or turning in a horizontal plane by said guide-plate, substantially as described.

In testimony whereof I have signed my name to this specification in the presence of two subscribing witnesses.

HENRY CARMICHAEL.

Witnesses:
  JAS. H. CHURCHILL,
  J. MURPHY.